United States Patent
Sheng et al.

(10) Patent No.: US 9,840,384 B2
(45) Date of Patent: Dec. 12, 2017

(54) SHEET SEPARATION MECHANISM WITH ANNULAR MEMBER AND SHEET-FED SCANNING APPARATUS USING SUCH MECHANISM

(71) Applicant: AVISION INC., Hsinchu (TW)

(72) Inventors: Shao-Lan Sheng, Hsinchu (TW); Chi-Yao Chen, Nanjhuang Township, Miaoli County (TW); Chin-Chu Chiu, Hengshan Township, Hsinchu County (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/340,222

(22) Filed: Nov. 1, 2016

(65) Prior Publication Data

US 2017/0144849 A1    May 25, 2017

(30) Foreign Application Priority Data

Nov. 20, 2015   (TW) .............................. 104218719 U (51) Int. Cl.
*B65H 3/52*    (2006.01)
*B65H 3/06*    (2006.01)
*H04N 1/00*    (2006.01)

(52) U.S. Cl.
CPC ........... *B65H 3/0684* (2013.01); *B65H 3/063* (2013.01); *B65H 3/5261* (2013.01); *B65H 3/5284* (2013.01); *H04N 1/00602* (2013.01); *H04N 1/00628* (2013.01); *H04N 1/00795* (2013.01); *B65H 2404/133* (2013.01); *B65H 2404/694* (2013.01); *H04N 2201/0063* (2013.01); *H04N 2201/0081* (2013.01); *H04N 2201/0094* (2013.01)

(58) Field of Classification Search
CPC .... B65H 3/5284; B65H 3/5261; B65H 3/063; B65H 2404/133; B65H 2404/694
See application file for complete search history.

(56) References Cited

U.S. PATENT DOCUMENTS

| 4,496,145 | A | * | 1/1985 | Fukui | ................... | B65H 3/5261 |
| | | | | | | 271/122 |
| 2006/0255527 | A1 | * | 11/2006 | Sheng | ................... | B65H 3/5284 |
| | | | | | | 271/121 |
| 2014/0203495 | A1 | | 7/2014 | Okumura et al. | | |

FOREIGN PATENT DOCUMENTS

| JP | 57126336 A | * | 8/1982 | ............... B65H 3/46 |
| JP | 2008081266 A | * | 4/2008 | |

* cited by examiner

*Primary Examiner* — Luis A Gonzalez (57) ABSTRACT

A sheet separation mechanism comprises a separation roller set and a reverse roller set rotating in the same rotation direction. The reverse roller set presses sheets onto the separation roller set to stop one or multiple ones of the sheets close to the reverse roller set from passing through a nip between the separation and reverse roller sets, and allow the sheet directly contacting the separation roller set to pass through the nip. The reverse roller set comprises a shaft, and two reverse rollers and an annular member all mounted on the shaft, which rotates the reverse rollers. The annular member, disposed between the two reverse rollers, is rotatable relatively to the shaft and movable relatively to the shaft in a radial direction of the shaft. The annular member and the reverse rollers commonly press the sheets. A sheet-fed scanning apparatus using the sheet separation mechanism is also provided.

10 Claims, 10 Drawing Sheets

SHEET SEPARATION MECHANISM WITH ANNULAR MEMBER AND SHEET-FED SCANNING APPARATUS USING SUCH MECHANISM

This application claims priority of No. 104218719 filed in Taiwan R.O.C. on Nov. 20, 2015 under 35 USC 119, the entire content of which is hereby incorporated by reference.

BACKGROUND OF THE INVENTION

Field of the Invention

The present invention relates to a sheet separation mechanism and a sheet-fed scanning apparatus using the sheet separation mechanism, and more particularly to a sheet separation mechanism with an annular member and a sheet-fed scanning apparatus using the sheet separation mechanism.

Description of the Related Art

A typical sheet separation mechanism may be applied to a scanner, a printer, a multi-function peripheral and the like to feed the sheets into a passageway separately. A conventional sheet separation mechanism includes a friction pad and a feeding roller working in conjunction with each other to perform the sheet separation operation according to the friction difference. The friction pad of the mechanism is usually in contact with a middle portion of the sheet. So, the middle portion of the sheet cannot be curled, but the sheet tends to be skewed. Another conventional sheet separation mechanism includes a reverse roller and a feeding roller working in conjunction with each other to perform the sheet separation operation. In this mechanism, two coaxial reverse rollers are usually adopted, and the sheet cannot be easily skewed, but the middle portion of the sheet tends to become curled owing to a gap between the two reverse rollers, and the sheet tends to become jammed or damaged.

United States Patent Publication No. 2014/0203495 discloses a sheet supply device, in which a sheet-pressing rocker arm with a special exterior design is disposed between the reverse rollers, and mainly functions to fill the gap between the two reverse rollers and to suppress the sheet from being curled upwards, wherein the shape of the front end of the rocker arm and the complicated mechanism are designed to form a movable closing portion to press the head portion of the sheet downwards so that the sheet cannot be twisted reversely by the reverse rollers to cause the paper jam. However, such the mechanism has the very complicated design and needs to be manufactured by the very complicated processes, and this is disadvantageous to the production cost, the assembling cost and the maintenance. Also, the mechanism tends to fail after being used for a long time, and the mechanism provides the sliding friction to the sheet and tends to wear the sheet.

SUMMARY OF THE INVENTION

Accordingly, the present invention has been proposed to solve the problems of the prior art, and an object of the present invention is to provide a sheet separation mechanism with an annular member and a sheet-fed scanning apparatus using the mechanism to simplify the structure and decrease the cost.

To achieve the above-identified object, the present invention provides a sheet separation mechanism comprising a separation roller set and a reverse roller set rotating in one rotation direction. The reverse roller set presses sheets onto the separation roller set to stop one or multiple ones of the sheets close to the reverse roller set from passing through a nip between the separation roller set and the reverse roller set, and allow the sheet directly contacting the separation roller set to pass through the nip. The reverse roller set comprises a shaft, two reverse rollers and an annular member. The two reverse rollers are mounted on the shaft and driven by the shaft to rotate. The annular member is mounted on the shaft, is disposed between the two reverse rollers, is rotatable relatively to the shaft, and is movable relatively to the shaft in a radial direction of the shaft. The annular member and the reverse rollers commonly press the sheets.

The present invention also provides a sheet-fed scanning apparatus comprising a housing formed with a transportation passageway; a transporting mechanism disposed in the housing; a scanning module disposed in the housing and on the transportation passageway; and the sheet separation mechanism, which is mounted on the housing, and transports the sheet into the transportation passageway. The transporting mechanism transports the sheet past the scanning module, and the scanning module scans the sheet to obtain an image signal.

The reverse roller set may further comprise a position restricting member, which is disposed between the annular member and the separation roller set, and directly contacts the annular member to support the annular member and restrict a position of the annular member.

The present invention further provides a sheet-fed scanning apparatus comprising: a housing formed with a transportation passageway; a transporting mechanism disposed in the housing; a scanning module disposed in the housing and on the transportation passageway; and the sheet separation mechanism. The sheet separation mechanism is mounted on the housing, and transports the sheet into the transportation passageway. The transporting mechanism transports the sheet past the scanning module, the scanning module scans the sheet to obtain an image signal, and the position restricting member is fixed to the housing.

In the above-mentioned sheet separation mechanism and sheet-fed scanning apparatus mentioned hereinabove, the annular member is used to fill the gap between the two reverse rollers to ensure that each sheet cannot be curled upwards to cause the paper jam when the sheet separation operation is performed. The annular member is freely movable between the two reverse rollers in the radial direction by the weight (gravity force) without the assistant of any external force, so that the annular flange can press the sheet. The position of the annular member can be restricted by the position restricting member, which can be directly formed on the outer cover to which the reverse roller is mounted. The outer cover can provide the position restricting function so that the annular flange provides a normal force to the sheet, and the annular flange may be configured such that only the rolling friction is present between the annular flange and the sheet, so that the sheet cannot be easily worn, and the sheet can be reliably in contact with the separation roller. Furthermore, the annular member may also discharge the electrostatic charges from the sheet to provide the function of electrostatic discharge protection.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to accompanying drawings.

Figure 1:
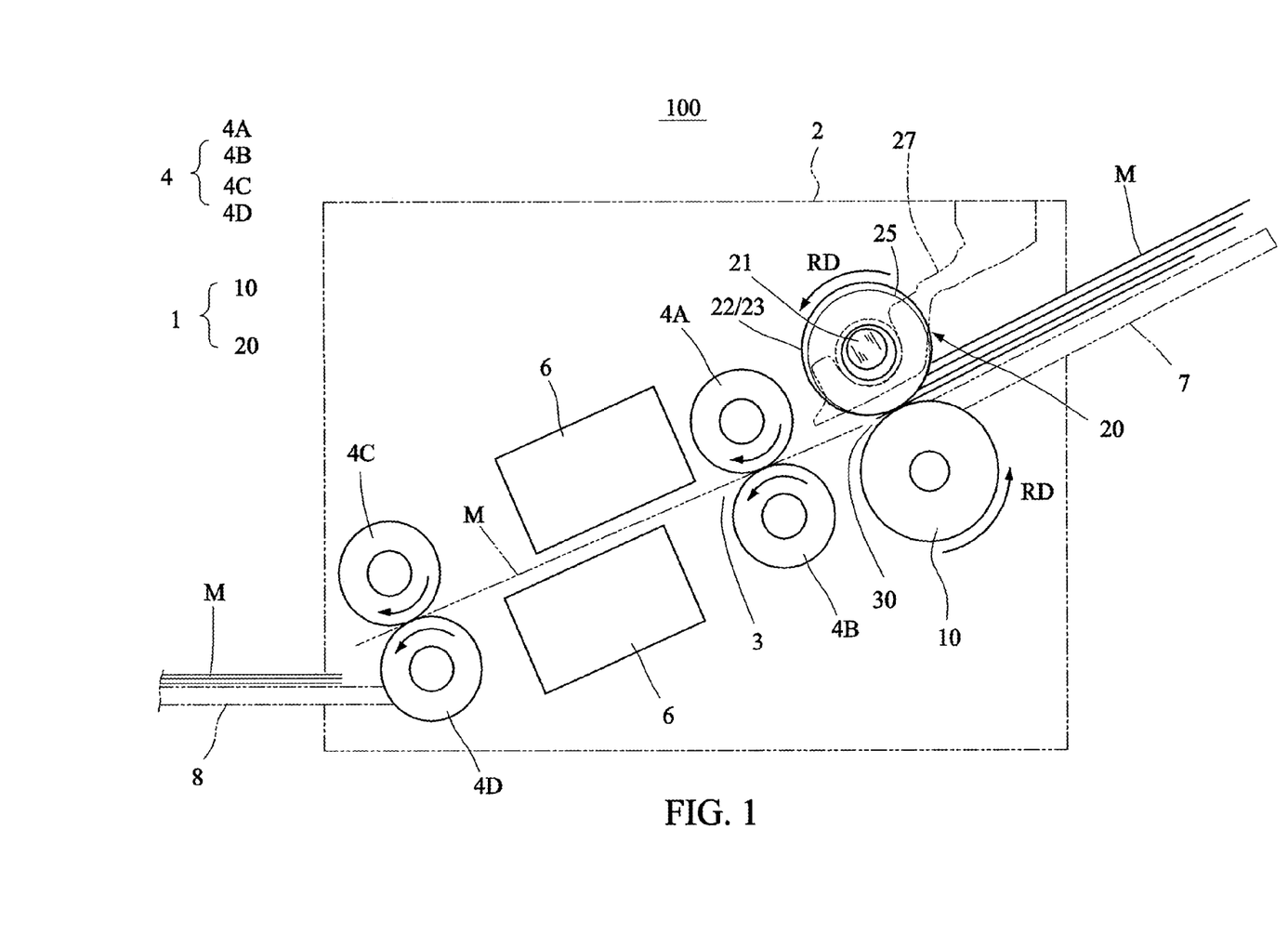
FIG. 1 is a schematic view showing a sheet-fed scanning apparatus according to a first embodiment of the present invention.

FIG. 1 is a schematic view showing a sheet-fed scanning apparatus 100 according to a first embodiment of the present invention. Referring to FIG. 1, the sheet-fed scanning apparatus 100 of this embodiment comprises a housing 2, a transporting mechanism 4, two scanning modules 6 and a sheet separation mechanism 1.

The housing 2 is formed with a transportation passageway 3. The transporting mechanism 4 is disposed in the housing 2, and is composed of rollers 4A to 4D in this embodiment. Two scanning modules 6 are disposed in the housing 2 and on the transportation passageway 3 to perform the duplex scan. It is worth noting that the present invention may also be implemented when only one single scanning module 6 is present, and that only the single scanning module 6 is described in the present invention. The sheet separation mechanism 1 mounted on the housing 2 performs a separation operation on sheets M placed on a supply tray 7 so that the sheets M can be transported into the transportation passageway 3 one by one. The transporting mechanism 4 transports the sheet M past the scanning module 6, which scans the sheet M to obtain an image signal. Finally, the sheet M is transported out to a discharge tray 8.

Figure 2:
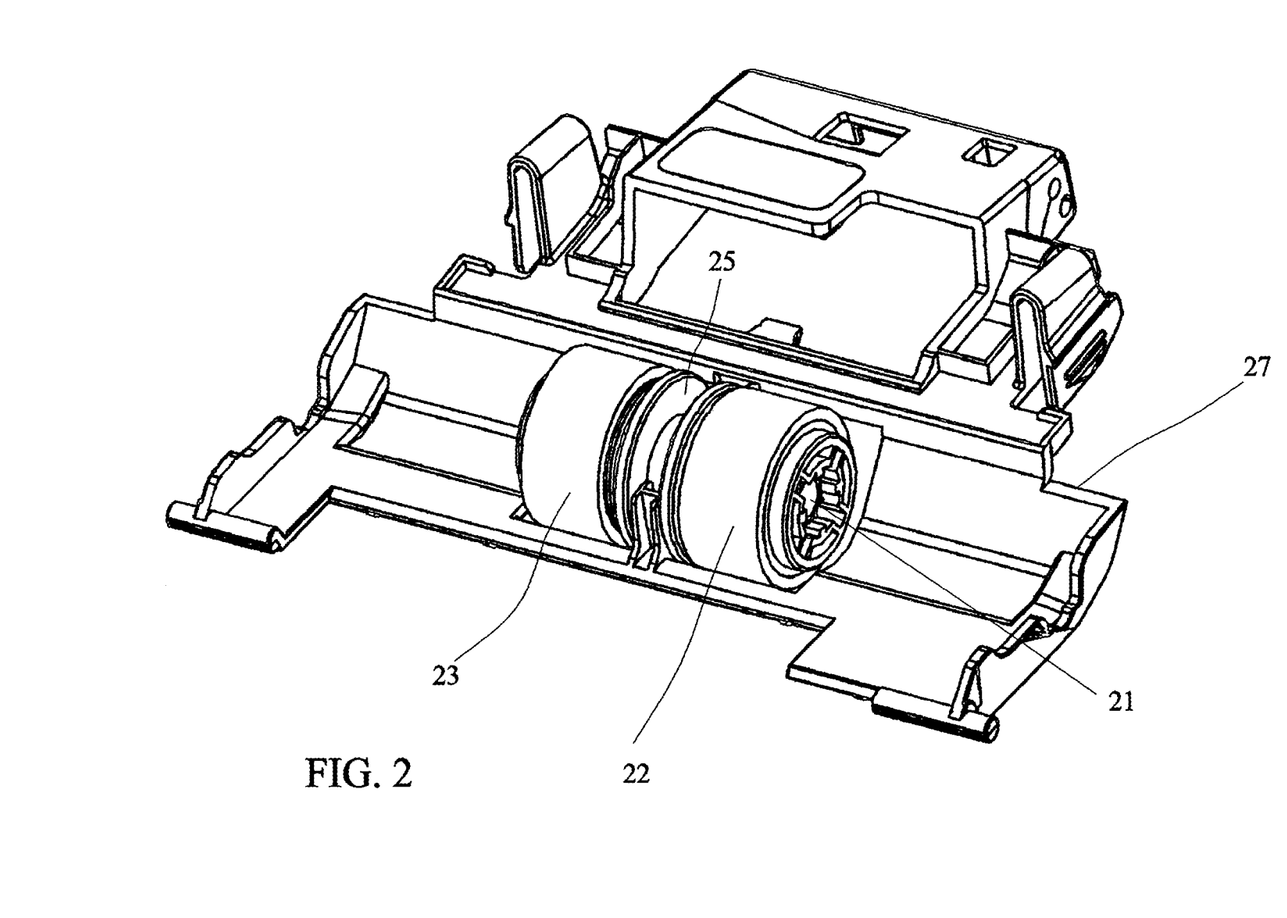
FIGS. 2 to 4 are partial pictorial views showing a sheet separation mechanism according to the first embodiment of the present invention.
Figure 3:
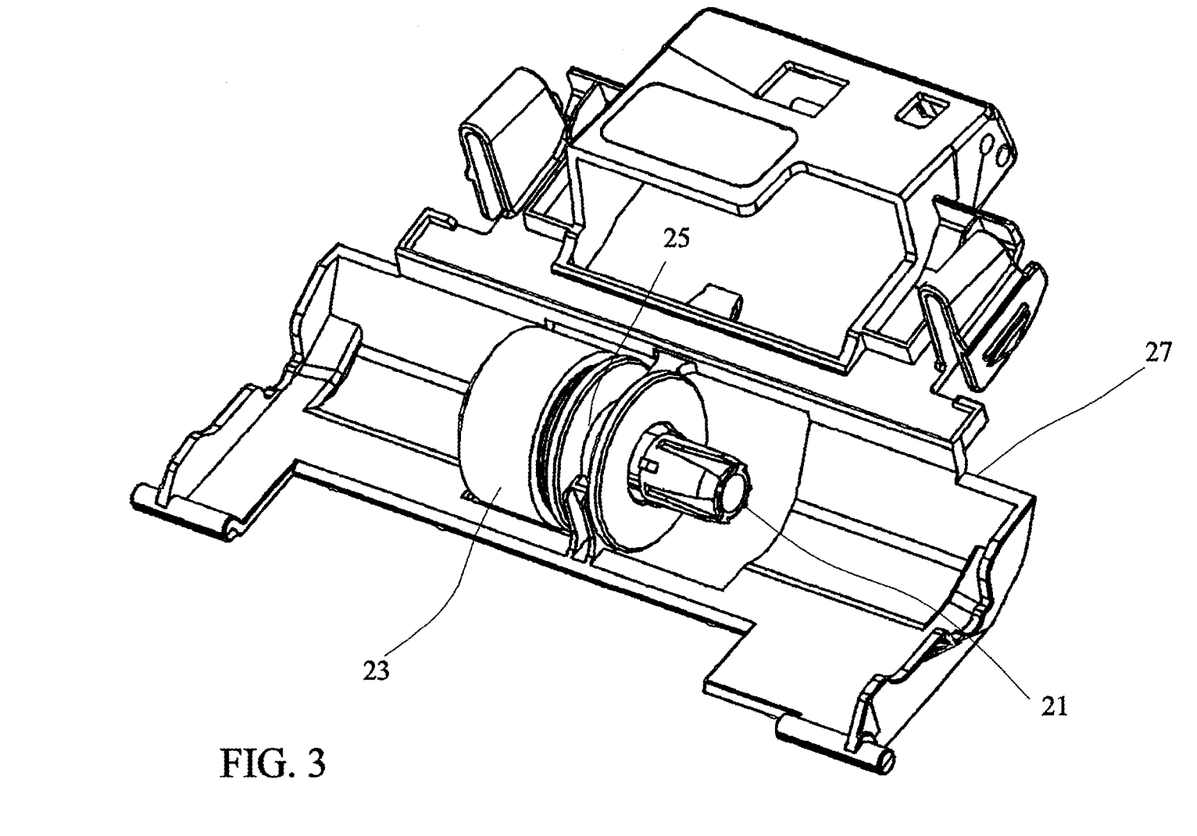
Figure 4:
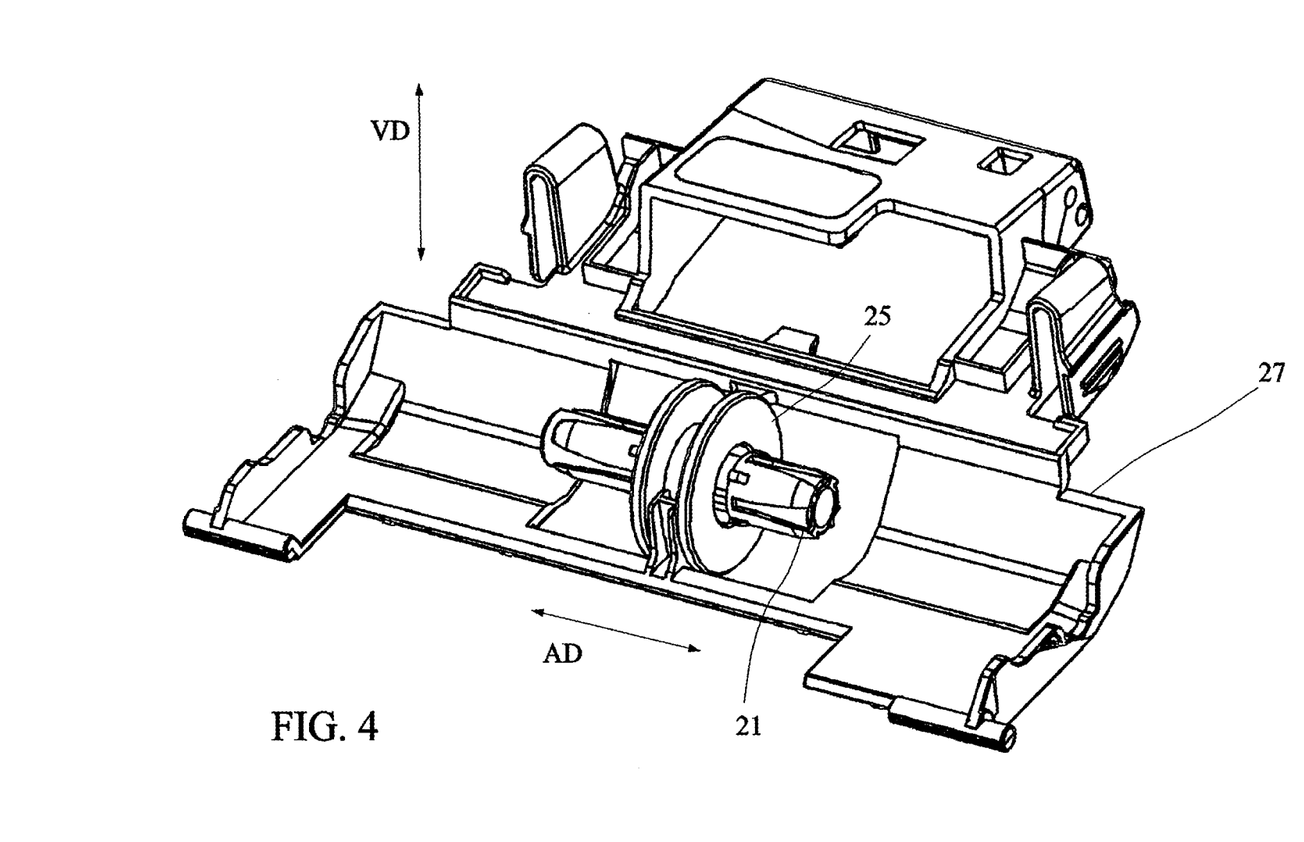

FIGS. 2 to 4 are partial pictorial views showing the sheet separation mechanism 1 according to the first embodiment of the present invention. Referring to FIGS. 1 to 4, the sheet separation mechanism 1 comprises a separation roller set 10 and a reverse roller set 20. The separation roller set 10 is driven by a power source to rotate in a rotation direction RD. The reverse roller set 20 is driven by another power source to rotate in the rotation direction RD. When the sheet separation operation is being performed, the reverse roller set 20 presses the sheets M on the separation roller set 10 to stop the sheet(s) M close to the reverse roller set 20 from passing through a nip 30 between the separation roller set 10 and the reverse roller set 20, and to allow the sheet M directly contacting the separation roller set 10 to pass through the nip 30.

The reverse roller set 20 comprises a shaft 21, two reverse rollers 22 and 23, an annular member 25 and a position restricting member 27. The two reverse rollers 22 and 23 are mounted on the shaft 21 and driven by the shaft 21 to rotate. The annular member 25 is mounted on the shaft 21, is disposed between the two reverse rollers 22 and 23, is rotatable relatively to the shaft 21, and is movable relatively to the shaft 21 in a radial direction VD of the shaft 21. The annular member 25 and the reverse rollers 22 and 23 commonly press the sheets M. That is, the reverse rollers 22 and 23 are not driven by the shaft 21 to rotate, but freely rotate to press the sheet M to prevent the sheet M from being curved or curled upwards. In this embodiment, the position restricting member 27 is disposed between the annular member 25 and the separation roller set 10, and directly contacts the annular member 25 to support the annular member 25 and to restrict the position of the annular member 25. It is worth noting that the position restricting member 27 may be directly fixed to the housing 2, but the position restricting member 27 is not the essential member (to be described later). In addition, the annular member 25 may be connected to a ground potential to discharge electrostatic charges of the sheet M.

The configuration of FIG. 3 is similar to that of FIG. 2 except that the reverse roller 22 is removed. The configuration of FIG. 4 is similar to that of FIG. 3 except that the reverse roller 23 is removed to completely show the annular member 25 and the shaft 21.

Figure 5:
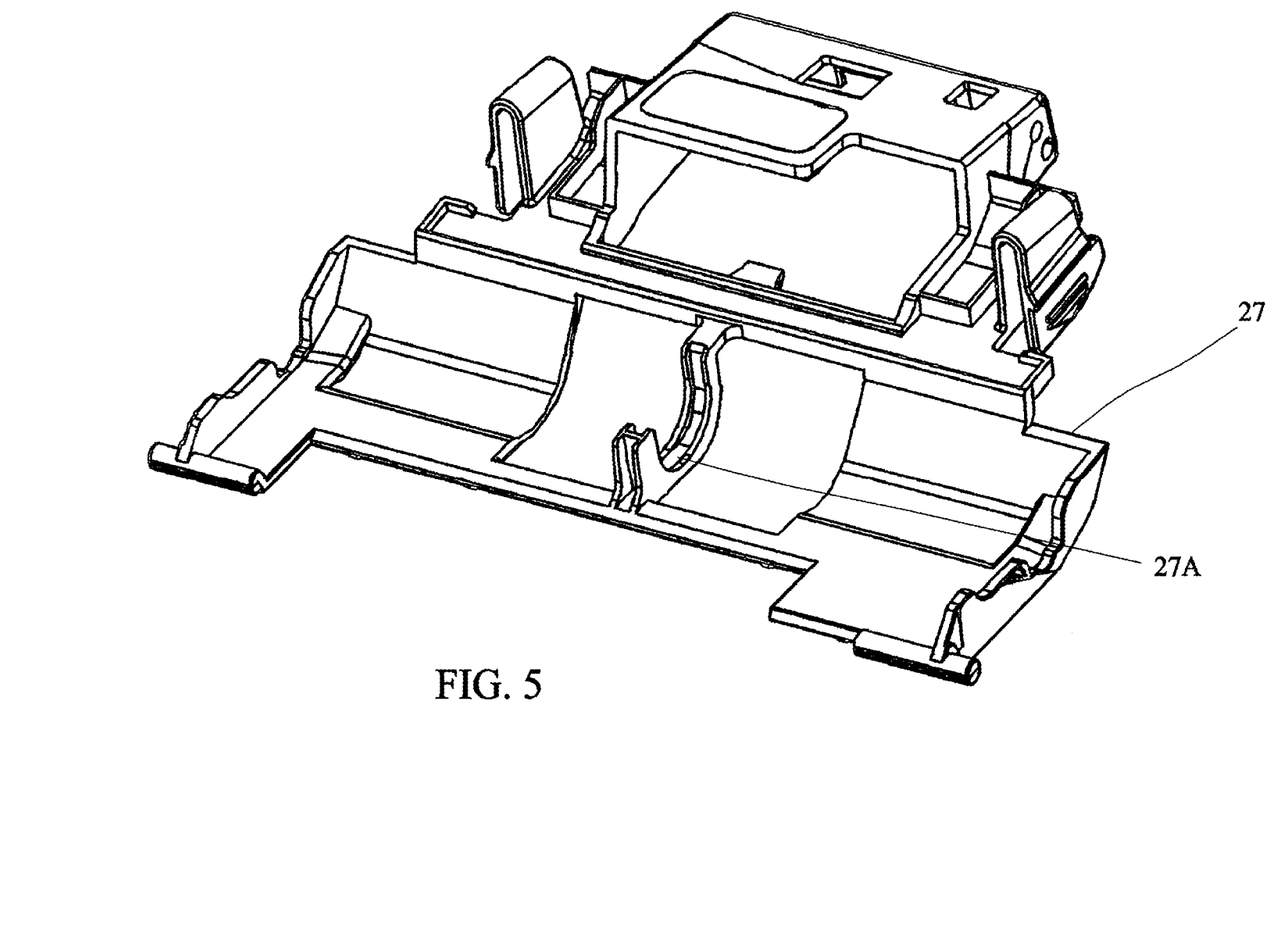
FIG. 5 is a pictorial view showing a position restricting member according to the first embodiment of the present invention.

FIG. 5 is a pictorial view showing the position restricting member 27 according to the first embodiment of the present invention. Referring to FIG. 5, the position restricting member 27 has a support portion 27A for supporting the annular member 25. The position restricting member 27 is one portion of an outer cover on which the reverse roller is mounted. The overall structure of FIG. 2 may be regarded as a replaceable module, which may be disassembled upon maintenance or even may be directly replaced with a new module.

Figure 6:
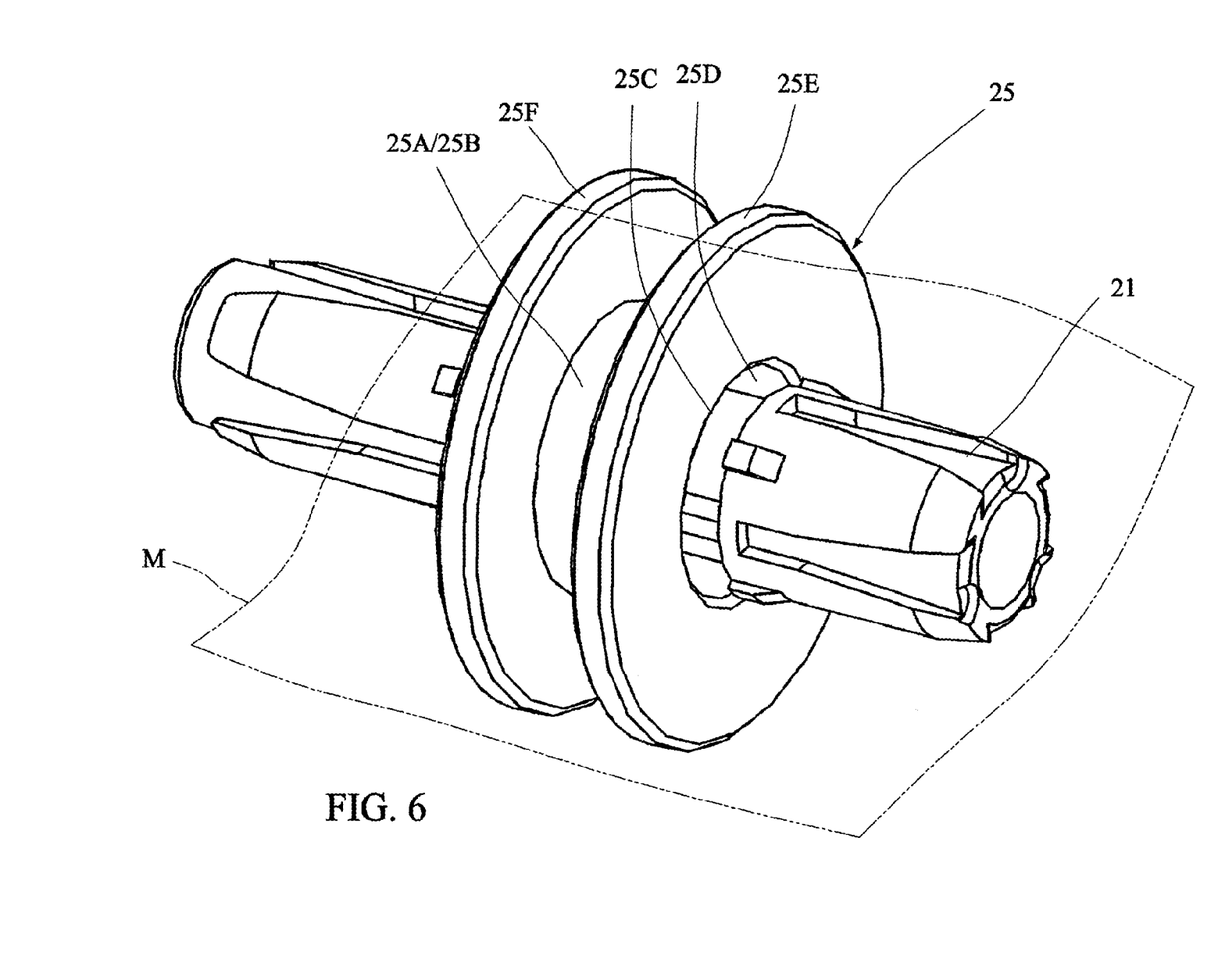
FIG. 6 is a pictorial view showing an annular member and a shaft according to the first embodiment of the present invention.
Figure 7:
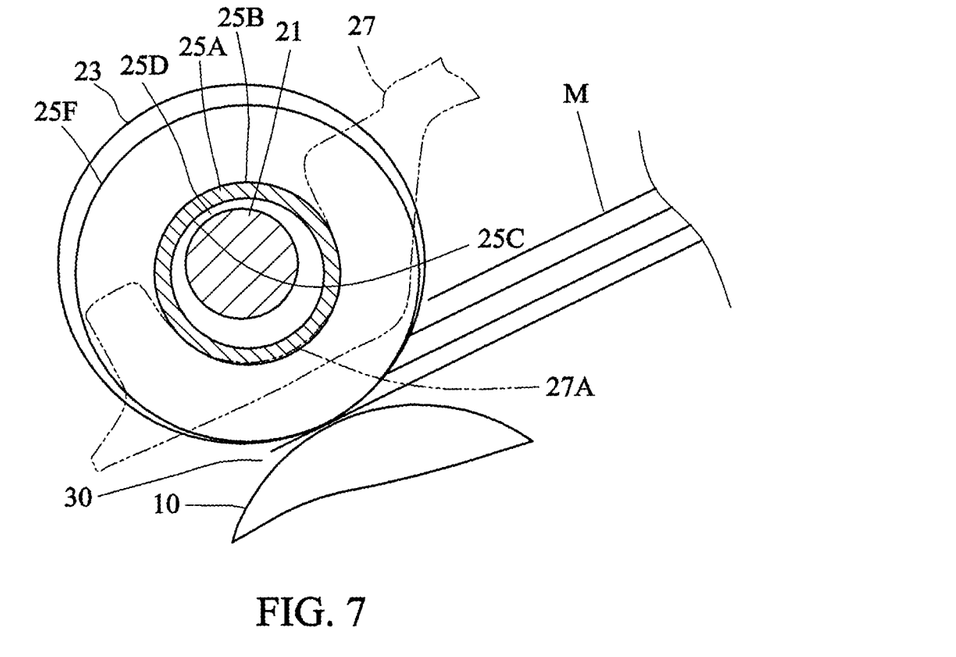
FIG. 7 is a partial pictorial view showing the sheet separation mechanism according to the first embodiment of the present invention.

FIG. 6 is a pictorial view showing the annular member 25 and the shaft 21 according to the first embodiment of the present invention. FIG. 7 is a partial pictorial view showing the sheet separation mechanism 1 according to the first embodiment of the present invention. Referring to FIGS. 6 and 7, the annular member 25 comprises a hollow cylinder 25A and two annular flanges 25E and 25F. An outer surface 25B of the hollow cylinder 25A rests against the support portion 27A of the position restricting member 27, and an inner surface 25C of the hollow cylinder 25A is separated from the shaft 21 by a gap 25D. The annular flanges 25E and 25F are disposed on the outer surface 25B of the hollow cylinder 25A, and the annular flanges 25E and 25F press the sheets M. The support portion 27A of the position restricting member 27 is disposed between the two annular flanges 25E and 25F. In this embodiment, an inner diameter of the annular member 25 is larger than an outer diameter of the shaft 21, so that the annular member 25 is movable relatively to the shaft 21 in the radial direction, and the annular member 25 is separated from the shaft 21 by the gap 25D.

Figure 8:
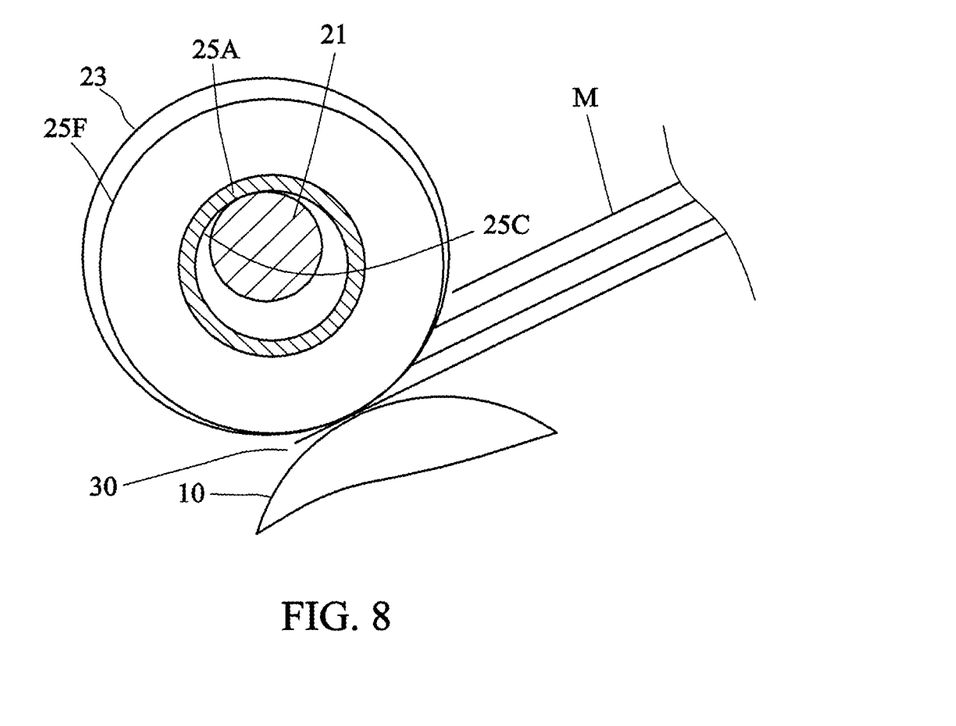
FIG. 8 is a partial pictorial view showing a sheet separation mechanism according to a second embodiment of the present invention.

FIG. 8 is a partial pictorial view showing a sheet separation mechanism according to a second embodiment of the present invention. Referring to FIG. 8, this embodiment is similar to the first embodiment except that the position restricting member 27 is not present. Thus, the hollow cylinder 25A of the annular member 25 and the inner surface 25C of the hollow cylinder 25A rest against the shaft 21. The annular member 25 moves in the radial direction by its own weight and rests against the shaft 21. It is worth noting that in another embodiment, a spring or a magnetic member may be used to provide an additional pressure to the annular member 25 to press the annular member 25 against the sheet M.

Figure 9:
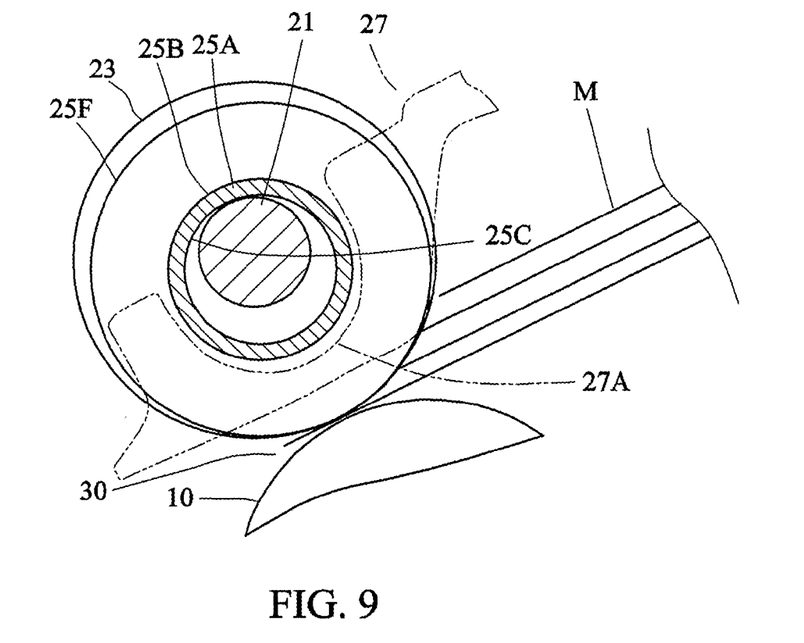
FIG. 9 is a partial pictorial view showing a sheet separation mechanism according to a third embodiment of the present invention.

FIG. 9 is a partial pictorial view showing a sheet separation mechanism according to a third embodiment of the present invention. Referring to FIG. 9, this embodiment is similar to the second embodiment except that the position restricting member 27 is provided, but the support portion 27A of the position restricting member 27 does not directly contact the hollow cylinder 25A. The position restricting member 27 only provides an axial position restricting function to prevent the annular member 25 from deflecting in an axial direction perpendicular to the surface of the drawing.

Figure 10:
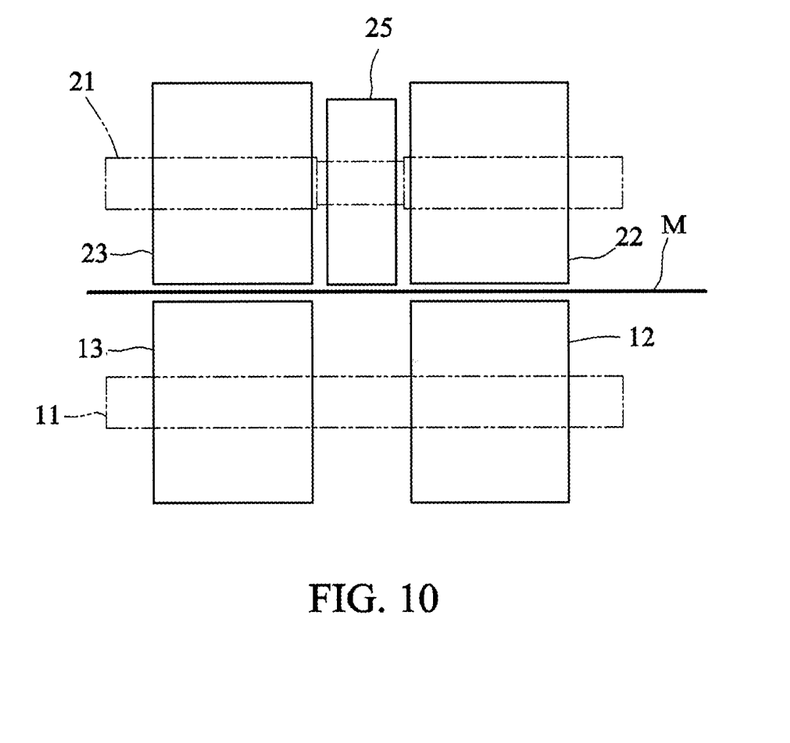
FIG. 10 is a partial top view showing the sheet separation mechanism according to the first embodiment of the present invention.

FIG. 10 is a partial top view showing the sheet separation mechanism according to the first embodiment of the present invention. Referring to FIG. 10, the separation roller set 10 comprises a shaft 11 and two separated separation rollers 12 and 13. The axial dimensions of the separation rollers 12 and 13 are the same as the axial dimensions of the reverse rollers 22 and 23, and the annular member 25 presses the sheet M to prevent the sheet M from being curled upwards. The shaft 21 has multiple stages of outer diameters, wherein the outer diameter of the portion of the shaft 21 matching with the annular member 25 is smaller to allow the radial movement of the annular member 25. The annular member 25 may also slightly move in the axial direction AD of the shaft 21 to prevent the provision of the too-large resisting force.

Figure 11:
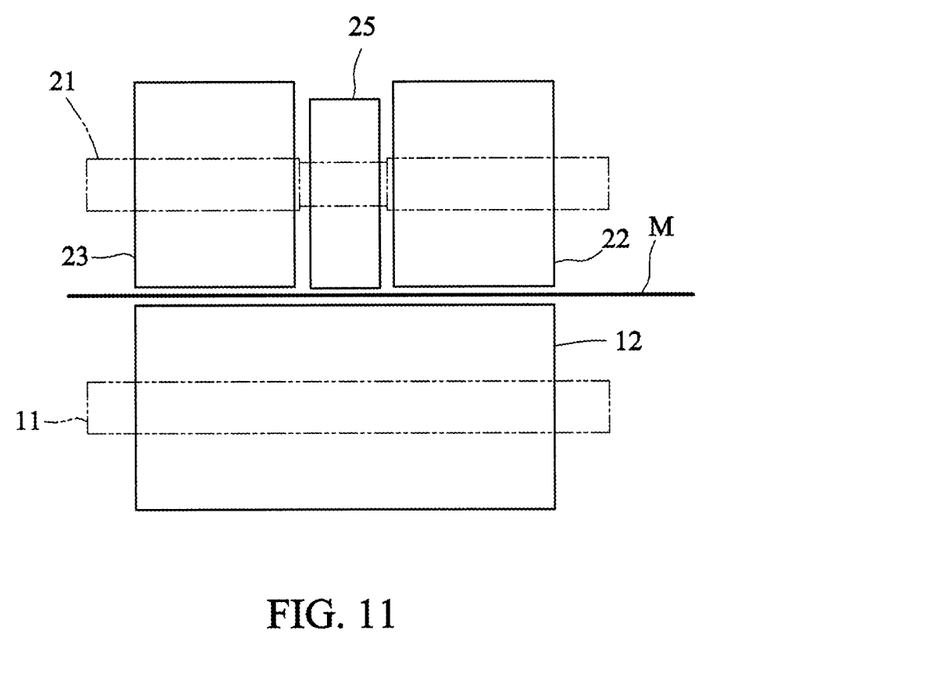
FIG. 11 is a partial top view showing a sheet separation mechanism according to a fourth embodiment of the present invention.

FIG. 11 is a partial top view showing a sheet separation mechanism according to a fourth embodiment of the present invention. Referring to FIG. 11, this embodiment is similar to the first embodiment except that only one single separation roller 12 is provided. The axial width of the separation roller 12 covers the overall axial width covered by the reverse rollers 22 and 23 to prevent the sheet M from being depressed downwards.

Figure 12:
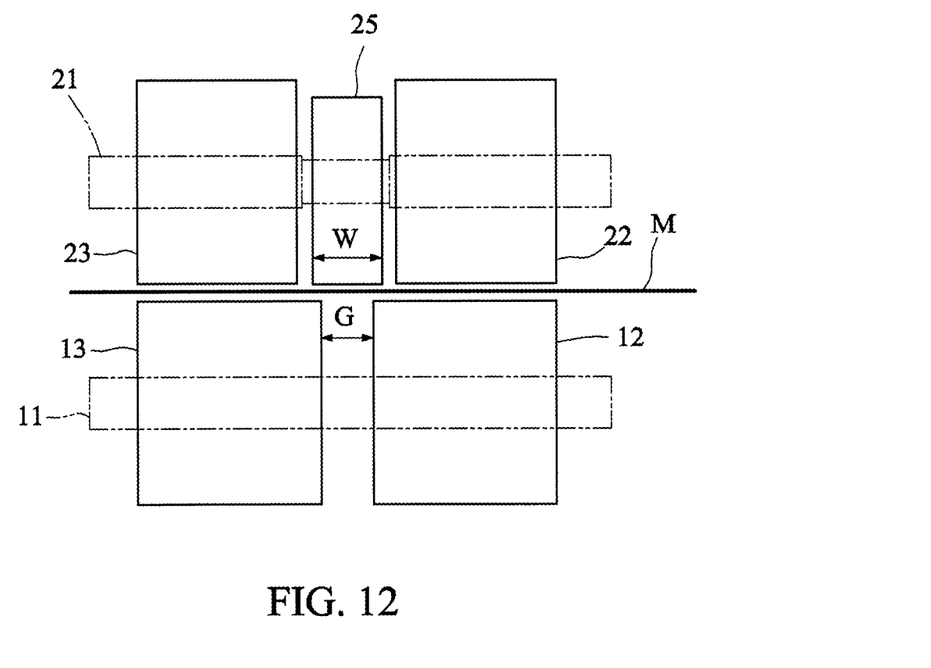
FIG. 12 is a partial top view showing a sheet separation mechanism according to a fifth embodiment of the present invention.

FIG. 12 is a partial top view showing a sheet separation mechanism according to a fifth embodiment of the present invention. Referring to FIG. 12, this embodiment is similar to the first embodiment except that the gap G between the two separation rollers 12 and 13 is smaller than the width W of the annular member 25, so that the separation rollers 12 and 13 may also provide the partial supporting function to the annular member 25 to prevent the sheet M from being depressed downwards.

Figure 13:
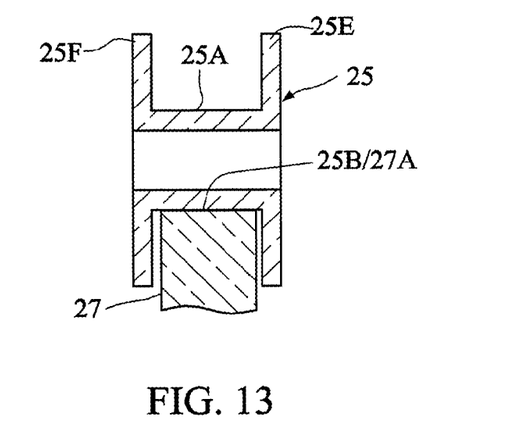
FIG. 13 is a cross-sectional view showing the sheet separation mechanism according to the first embodiment of the present invention.
Figure 14:
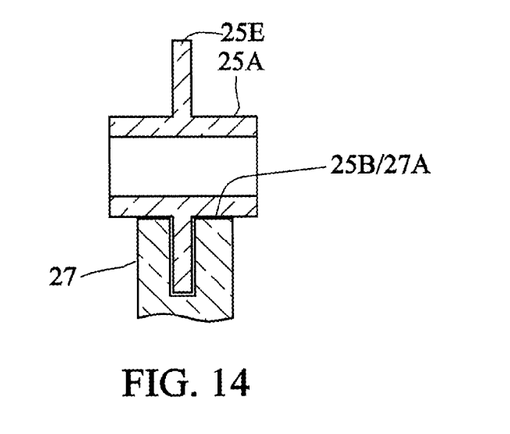
FIG. 14 is a cross-sectional view showing a sheet separation mechanism according to a sixth embodiment of the present invention.
Figure 15:
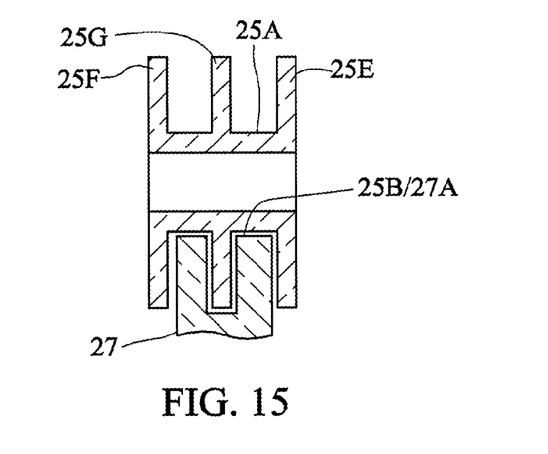
FIG. 15 is a cross-sectional view showing a sheet separation mechanism according to a seventh embodiment of the present invention.

FIG. 13 is a cross-sectional view showing the sheet separation mechanism according to the first embodiment of the present invention. Referring to FIG. 13, the annular member 25 has two annular flanges 25E and 25F. FIG. 14 is a cross-sectional view showing a sheet separation mechanism according to a sixth embodiment of the present invention. Referring to FIG. 14, the annular member 25 has one annular flange 25E, while the position restricting member 27 has a groove matching with the annular flange 25E. FIG. 15 is a cross-sectional view showing a sheet separation mechanism according to a seventh embodiment of the present invention. Referring to FIG. 15, the annular member 25 has three annular flanges 25E, 25F and 25G, and the position restricting member 27 also has one groove matching with the annular flange 25G to provide axial and radial position restricting effects. The annular flange and the hollow cylinder 25A are made of the same material. In another example, the annular flange and the hollow cylinder 25A are made of different materials, and are not integrally formed jointly with each other.

Compared with the prior art, the overall sheet separation mechanism has the quite simple structure, can be easily assembled, and has the effectively reduced cost.

In the above-mentioned sheet separation mechanism and sheet-fed scanning apparatus of the present invention, the annular member is used to fill the gap between the two reverse rollers to ensure that each sheet cannot be curled upwards to cause the paper jam when the sheet separation operation is performed. The annular member is freely movable between the two reverse rollers in the radial direction by the weight (gravity force) without the assistant of any external force, so that the annular flange can press the sheet. The position of the annular member can be restricted by the position restricting member, which can be directly formed on the outer cover to which the reverse roller is mounted. The outer cover can provide the position restricting function so that the annular flange provides a normal force to the sheet, and the annular flange may be configured such that only the rolling friction is present between the annular flange and the sheet, so that the sheet cannot be easily worn, and the sheet can be reliably in contact with the separation roller. Furthermore, the annular member may also discharge the electrostatic charges from the sheet to provide the function of electrostatic discharge protection.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A sheet separation mechanism, comprising:
    a separation roller set rotating in a rotation direction; and
    a reverse roller set, which rotates in the rotation direction and presses sheets onto the separation roller set to stop one or multiple ones of the sheets close to the reverse roller set from passing through a nip between the separation roller set and the reverse roller set, and allow the sheet directly contacting the separation roller set to pass through the nip, wherein the reverse roller set comprises:
    a shaft;
    two reverse rollers mounted on the shaft and driven by the shaft to rotate;
    an annular member, which is mounted on the shaft, disposed between the two reverse rollers, is rotatable relatively to the shaft, and is movable relatively to the shaft in a radial direction of the shaft, wherein the annular member and the reverse rollers commonly press the sheets; and a position restricting member, which is disposed between the annular member and the separation roller set, and directly contacts the annular member to support the annular member and restrict a position of the annular member, wherein the annular member comprises:
- a hollow cylinder having an outer surface resting against a support portion of the position restricting member, and an inner surface separated from the shaft by a gap; and
- one or multiple annular flanges disposed on the outer surface of the hollow cylinder and pressing the sheets.

2. The sheet separation mechanism according to claim 1, wherein the number of the annular flanges is two, and the support portion of the position restricting member is disposed between the two annular flanges.

3. The sheet separation mechanism according to claim 1, wherein an inner diameter of the annular member is larger than an outer diameter of the shaft, so that the annular member is movable relatively to the radial direction of the shaft, and the annular member is separated from the shaft by the gap.

4. The sheet separation mechanism according to claim 1, wherein an inner diameter of the annular member is larger than an outer diameter of the shaft, so that the annular member is movable relatively to the radial direction of the shaft.

5. The sheet separation mechanism according to claim 1, wherein the annular member is connected to a ground potential to discharge electrostatic charges of the sheet.

6. A sheet-fed scanning apparatus, comprising:
a housing formed with a transportation passageway;
a transporting mechanism disposed in the housing;
a scanning module disposed in the housing and on the transportation passageway; and
the sheet separation mechanism according to claim 1, wherein the sheet separation mechanism is mounted on the housing, and transports the sheet into the transportation passageway, the transporting mechanism transports the sheet past the scanning module, and the scanning module scans the sheet to obtain an image signal.

7. A sheet-fed scanning apparatus, comprising:
a housing formed with a transportation passageway;
a transporting mechanism disposed in the housing;
a scanning module disposed in the housing and on the transportation passageway; and
the sheet separation mechanism according to claim 1, wherein the sheet separation mechanism is mounted on the housing, and transports the sheet into the transportation passageway, wherein the transporting mechanism transports the sheet past the scanning module, the scanning module scans the sheet to obtain an image signal, and the position restricting member is fixed to the housing.

8. A sheet separation mechanism, comprising:
a separation roller set rotating in a rotation direction; and
a reverse roller set, which rotates in the rotation direction and presses sheets onto the separation roller set to stop one or multiple ones of the sheets close to the reverse roller set from passing through a nip between the separation roller set and the reverse roller set, and allow the sheet directly contacting the separation roller set to pass through the nip, wherein the reverse roller set comprises:
a shaft;
two reverse rollers mounted on the shaft and driven by the shaft to rotate; and
an annular member, which is mounted on the shaft, disposed between the two reverse rollers, is rotatable relatively to the shaft, and is movable relatively to the shaft in a radial direction of the shaft, wherein the annular member and the reverse rollers commonly press the sheets, wherein the annular member comprises:
- a hollow cylinder having an inner surface resting against the shaft; and
- one or multiple annular flanges disposed on an outer surface of the hollow cylinder and pressing the sheets.

9. The sheet separation mechanism according to claim 8, wherein the annular member moves in the radial direction and rests against the shaft by a weight of the annular member.

10. A sheet-fed scanning apparatus, comprising:
a housing formed with a transportation passageway;
a transporting mechanism disposed in the housing;
a scanning module disposed in the housing and on the transportation passageway; and
the sheet separation mechanism according to claim 8, wherein the sheet separation mechanism is mounted on the housing, and transports the sheet into the transportation passageway, the transporting mechanism transports the sheet past the scanning module, and the scanning module scans the sheet to obtain an image signal.

* * * * *